Feb. 23, 1926. 1,574,622
L. GRANGER ET AL
PROCESS OF DISTILLING VOLATILE PRODUCTS
Filed Jan. 9, 1920  2 Sheets-Sheet 2
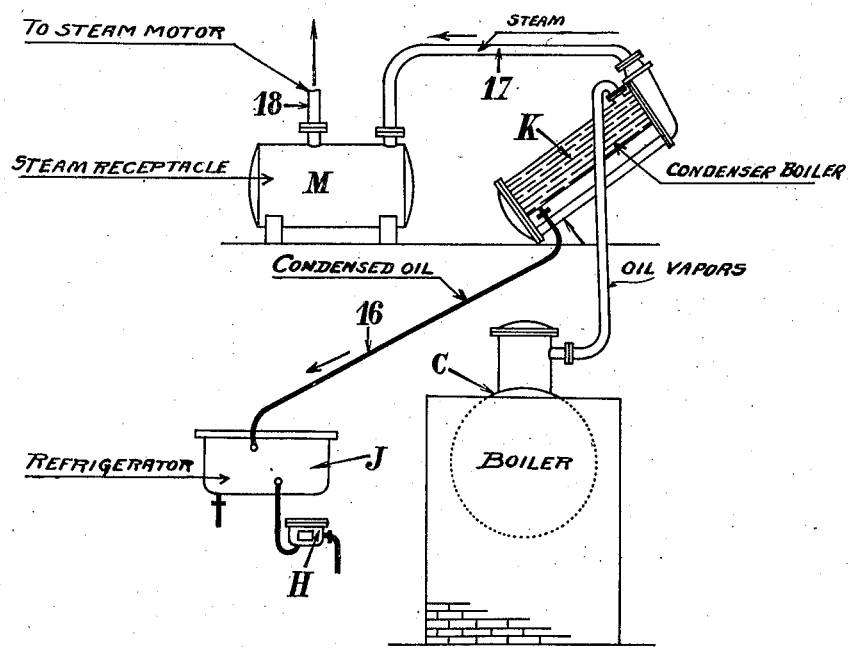

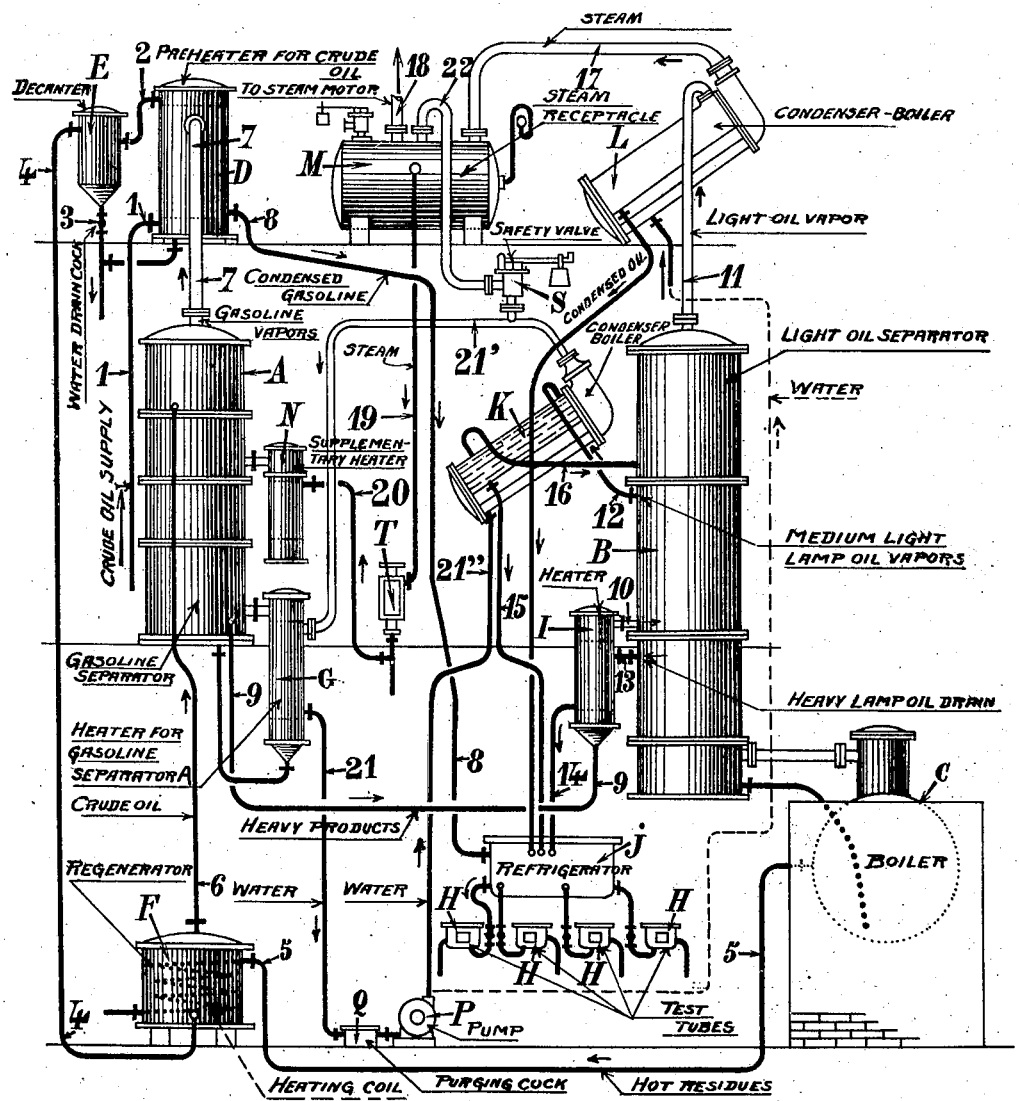

Patented Feb. 23, 1926.

1,574,622

UNITED STATES PATENT OFFICE.

LOUIS GRANGER, CHARLES MARILLER, AND CHARLES PRACHE, OF PARIS, FRANCE.

PROCESS OF DISTILLING VOLATILE PRODUCTS.

Application filed January 9, 1920. Serial No. 350,354.

*To all whom it may concern:*

Be it known that we, LOUIS GRANGER, CHARLES MARILLER, and CHARLES PRACHE, manufacturers, citizens of the French Republic, the first two residing at 38-40 Rue des Peupliers, Paris, and the third residing at 48 Avenue du Maine, Paris, France, have invented certain new and useful Improvements in Processes of Distilling Volatile Products, of which the following is a specification.

The distillation of mineral oils is effected most frequently in large boilers heated by a furnace, which boilers, with their condensers, constitute continuously working stills.

The apparatus proposed for ensuring continuous distillation has not produced profitable results in industrial operations. When the distillation is accelerated, that is when the greater portion, about 75% of the crude oil is evaporated, and there is but little residue, the heat regenerators employed can only yield a few calories and the cost of fuel is considerable. On the other hand, in continuously acting apparatus the condensations effected for bringing the products to commercial densities are considerable and involve a fresh expenditure of fuel. The expense of continuously acting apparatus equals and at times exceeds that of intermittently acting apparatus because of this.

In all this apparatus there is a serious defect which is obviated by the present invention. Whereas in known apparatus, the calories of the fuel reappear in the vapors being condensed in the condensers, heating bodies of water that cannot be utilized, the process forming the object of the present application enables the calories to be recovered in the form of steam under pressure, steam which can be utilized for heating, distilling or other apparatus, or for working steam motors.

It has also been suggested that the distilled vapors of higher boiling point be used as a heating agent to distill off the products of lower point, but this has proved unsatisfactory for the reason that a uniform product of the first distillation is not obtained. This is principally due to variations in the heating in the second distillation and consequent variation in the heating medium for the first distillation, and to the fact that the latent heat of the vapor being low, it cannot be transported the necessary distances without serious losses by condensation.

We have discovered that by condensing the oil vapors in a condenser-boiler, in which water is converted into steam, the condensation losses of the vapor are eliminated since steam lends itself more readily to transportation and a reservoir of heating medium of high latent heat can be maintained between the first and second stills, whereby the irregularities of heating in the second distillation are smoothed out and not transferred to the first distillation.

The novel process can be applied either to continuously or intermittently acting apparatus and it enables the cost of fuel to be considerably reduced.

In principle, this process consists in introducing into the path of the petroleum vapors to be condensed one or more special condenser-boilers receiving water in a liquid state. The petroleum vapor is condensed and causes this water to boil. The steam thus produced can be employed in various ways, according to circumstances.

In the drawings annexed hereto by way of example:

Figure 1 represents the application of the invention to a continuously acting apparatus for distilling crude mineral oils; and Figure 2 shows the application of the invention to an intermittently acting apparatus.

In the continuously acting apparatus (Figure 1), the crude mineral oil is successively treated in two groups of devices.

A first separator A which takes out the gasoline;

A second separator B which extracts the lamp oils and the heavy oils. This latter separator is heated by a boiler C.

The raw material to be treated, that is to say the crude mineral oil, passes through pipe 1 into a pre-heater D, generally constituted by a tubular pile, heated by the condensing gasoline vapors which come from the separator A. The crude heated material leaves the preheater D through pipe 2 and enters a decanter E which effects a separation of the water precipitated by the increase of temperature. This water is carried off by a cock 3. The crude mineral oil then passes through the pipe 4 into another pre-heater or regenerator F in which it is heated to a higher temperature by the boiling residues coming out of the boilers C, through pipe 5 and circulating in a coil or in a suitable tubular device.

The crude petroleum then passes through the pipe 6 into the gasoline separator A, which is heated at the bottom by a tubular device or coil G. In prior apparatus this tubular device was heated by the steam coming from special generators heated by separate heat sources but this is heated by steam from the condenser-boiler K. The gasoline vapors pass out at 7 into the condenser-preheater D, the condensed gasoline being conveyed through the pipe 8 to the special test tubes at H where it is collected.

It is easy to effect a separation of the gasoline if desired, by providing concentration parts above the separator A.

The crude petroleum, deprived of its light products is carried off through the pipe 9 and passes into the heater I thence through pipe 10 into the separator B which distills out the light oils. The separator B, heated by the boiler C, distills off oils of varying boiling points through special pipes 11, 12 and 13. The heaviest lamp oils are taken off by the pipe 13 and enter the condenser-preheater I, being then conveyed through pipe 14 to the refrigerator J and thence to the test tubes at H. The lighter lamp oil vapors are conveyed through the pipe 12 to a condenser-boiler K, preferably having inclined water-tubes, as shown, which partially condenses them. The condensed liquid is conveyed through the pipe 15 to the refrigerator J and thence to the test tubes at H. As regards the non-condensed vapors in the condenser-boiler, they return to the separator through the pipe 16.

A condenser-boiler L condenses the lightest vapors which escape from the top of the separator B through pipe 11. The condenser boilers K and L are supplied with water through pipe 21" by a pump P which takes the water condensed in the heater G and drawn off through the pipe 21 and purging cock Q.

In order to utilize the temperature of the vapors to the maximum extent it is necessary to employ a condenser-boiler. For this purpose a condenser-boiler with rapid circulation will generally be employed, one with inclined tubes being indicated in the drawings only by way of example.

The steam produced by the condenser-boiler L is conveyed through pipe 17 to a storage vessel M from which it can be conveyed through pipe 18 to steam motors and through pipe 19 to a steam compressor T which, if necessary, raises it to the required temperature so that it can be utilized for the heating, if its own temperature be not sufficient. By way of example, the drawing indicates a possible utilization consisting in conveying this steam through pipe 20 to a supplementary heater N placed on the light product separator A. The steam emitted through the evaporator K passes out through pipe 21′ and supplies heat to the heater G. The water of condensation of this vapor is drawn off through pipe 21 and retaken as previously stated by the pump P in order to be put in circuit again through pipe 21″. In case of excessive evaporation the steam escapes through a safety valve S and passing through pipe 22 reaches the steam cylinder M previously mentioned.

The effect of this combination is that the heating of the light products separator A is effected without expense. On the other hand, a certain quantity of steam remains to be employed for heating or for the production of motive power. The water of condensation is not renewed, the same water being continuously circulated. The apparatus as a whole is an automatic condenser and requires only a small quantity of condensing water. In the case of the invention being applied to an intermittently acting apparatus all that is required is to introduce a condenser-boiler K into the path of the vapors between the boiler C and the condenser J of each apparatus, as illustrated in Figure 2. All the condenser-boilers are connected through pipes with the steam cylinder M which they supply. As an example the pressure may be kept at 6 atmospheres, and the temperature of the vapor about 159°. As the fall necessary for the working of the evaporator may be 4° to 5°, the condenser-boiler will act as soon as the vapors are at 163° to 165°, that is practically as soon as the light products are eliminated. In the case of a medium American mineral oil, the evaporator will act during nearly three-quarters of the duration of the operation.

The new process assures the following advantages:

1.—The condenser for the oil vapors is really a generator or an accumulator of energy in the form of heat from which supplies are drawn according to the wants to be satisfied.

2.—The steam possesses considerable latent heat as distinguished from petroleum vapor. In consequence of this there is less loss by radiation in transporting to a distance.

3.—Steam may be used to operate compressors or be retaken by these apparatus, which in many cases permits valuable combinations.

4.—Irregularities of the furnace are no longer to be feared. A simple safety valve conveying the excess of vapor to a cylindrical device obviates all dangerous effects of pressure and consequently of vaporization. The furnace no longer puts the indirectly heated parts out of order.

5.—The flowings or running off can be obtained at a great height and the refluxes are easily effected. The height of the apparatus is reduced.

6.—The process can be employed for the production of motive power and, if applied to either continuously or to intermittently acting apparatus, steam generators may be dispensed with.

7.—The cost of water is almost entirely obviated. The condensers are not affected by scale. Consequently cleaning is dispensed with.

The process can be employed for distilling not only hydrocarbons such as mineral oils but also for the distillation of products more volatile than water such as alcohol, benzols, ethers, etc. In this case the steam produced by the evaporators K and L is at a pressure lower than atmospheric. In order that it may be employed again it is necessary to compress it to raise its pressure. This compression is effected by the compressor T.

Having thus described our invention, what we claim and desire to secure by Letters Patent is:

The method of distilling crude mineral oil consisting in vaporizing the oil, condensing the vapors in evaporators with rapid circulation of water to ensure operation with small temperature drop, vaporizing water in said evaporators by absorbing the latent heat of the condensed products to produce steam at a temperature only slightly less than the condensed vapors and at a high pressure and using said steam in the heating of said oil and for the production of power.

In testimony whereof we affix our signatures.

LOUIS GRANGER.
CHARLES MARILLER.
CHARLES PRACHE.